Patented Apr. 25, 1950

2,505,304

UNITED STATES PATENT OFFICE 2,505,304

LIGNIN COMPOUNDS AND METHOD FOR MAKING SAME

Jörgen Richter Salvesen, Wausau, Wis., and Carlyle Harmon, Springfield, Mass., assignors to Marathon Corporation, Rothschild, Wis., a corporation of Wisconsin No Drawing. Application June 19, 1947, Serial No. 755,736

4 Claims. (Cl. 260—124).

This invention relates to a method for making new and useful lignin compounds from lignosulfonates by subjecting the latter to critically controlled alkaline hydrolyzing conditions.

It is well established that lignin from softwood trees is composed of propyl-guaiacol monomers condensed or polymerized to units of various molecular size. In the lignosulfonates, the sulfonic groups have entered into some of the propyl side chains, making the product soluble in aqueous acid as well as alkali solutions.

It is further known that when lignosulfonates and caustic alkali in aqueous solution are heated to sufficiently elevated temperature, the lignosulfonates are not only desulfonated but also demethylated so that the guaiacol compounds are converted into catechols (ortho-diphenols).

Through numerous experiments we have found that some such demethylated lignin compounds have unique and useful properties for various applications, but also that very specific process conditions are required to obtain the compounds with the desired properties. We believe that the formation of catechol groupings in the lignin compounds is important for obtaining organic compounds of the desired properties which in many respects are similar to those in the group of tannins known as "catechol tans." However, we have also found that the alkaline hydrolysis reaction with lignosulfonates is a very complex one where numerous other factors such as condensation, carbonization, de-polymerization, alkyl-alkoxyl group shifting may enter in aside from the de-methylation to affect the nature of the product produced. This invention relates to the critical conditions which we have discovered are necessary to produce useful lignin products by alkaline hydrolysis under controlled conditions which will exclude or minimize undesirable reactions.

The starting material we prefer to use in our process is a solution of substantially pure sodium lignosulfonates substantially free from calcium and magnesium ions. One source for such starting material is basic calcium lignosulfonate, obtained according to U. S. Patent Re. 18,268, December 1, 1931, obtained from waste sulfite liquor resulting from the usual commercial production of paper making pulp by treatment of wood with calcium bisulfite liquor. This product is converted to the sodium salt in known ways, i. e. by addition of sodium bicarbonate with subsequent removal of $CaCO_3$ formed, or by addition of $Na_2SO_4$ and $H_2SO_4$ and removal of $CaSO_4$ then formed. Another suitable starting material for our process is the liquor which results when the above mentioned basic calcium lignosulfonate is heated for 30 to 90 min. at 160° to 180° C. with NaOH, then if desired after extracting out phenolic compounds with substantially water immiscible alcohol according to U. S. Patent No. 2,104,701, January 4, 1938, lime salts are removed by treatment with $CO_2$ or flue gas according to the specific conditions given in U. S. Patent No. 2,371,136, March 13, 1945. Still another suitable starting material is the solution resulting when basic calcium lignosulfonate and caustic soda are heated to 150° to 180° C. for 30 to 90 minutes with continuous introduction of controlled amounts of oxygen or air. Such cooked liquor has the calcium compounds in insoluble form which can be removed by settling or filtering to give a suitable sodium lignosulfonate for our process.

It is to be understood that the previously described starting lignin containing materials are illustrative examples of specific starting materials that can be used in our process and that sodium lignosulfonates in general can be used in our method for producing the desired lignin compounds. We prefer to use a sodium lignosulfonate solution with solids content by weight of from about 250 to about 350 grams per liter and to such solution NaOH is added in such amounts that the mixture contains by weight from about 50 to about 100 grams per liter NaOH. We have found that it is important to operate our process in this range of NaOH content, since lower amounts NaOH will give a black insoluble organic residue as result of the pressure cook, whereas larger amounts than 100 grams per liter NaOH serve no useful purpose. The solution mixture is cooked under autogenic pressure or higher as for example 1500 lbs. per sq. in. at a temperature in the range of 265° to 325° C. Higher as well as lower temperatures will give less desirable products. We have carried out such cooks in batch operation as well as continuous processing with heat exchangers and pressure holding tank, but in both such procedures it is necessary to maintain the solution for a period of 30 to 120 minutes within the temperature range previously indicated. When the above specified amount of caustic soda is used, the cooked charge has residual free NaOH which we find practical to neutralize with $H_2SO_4$ or $CO_2$ addition to pH around 10.5 after which the solution may be utilized directly for any desired purpose or it may be dried to a powder by conventional means, i. e., spray or drum drying.

The product produced by the foregoing procedure has a strong affinity for oxygen so that under ordinary room conditions, especially if sufficient moisture is present, it will combine with sufficient oxygen to heat up considerably and as high as the ignition point, thereby causing a fire during storage. In order to reduce such hazard we can modify our product so as to reduce its tendency to absorb oxygen. For this purpose we may treat the cooked liquor as obtained by the method previously described before drying same by acidifying the solution by adding a suitable acid such as $H_2SO_4$ or passing $CO_2$ into the solution to reduce the pH to about 9. A part of the organic matter in the solution is precipitated at this pH condition. The resulting mixture is dried in any suitable manner to produce a dried lignin product which will not tend to heat up or ignite during storage under normal room conditions. This product is not completely water soluble but can be completely solubilized by suspending same in water to which caustic soda or soda ash is added to produce a pH of about 10.5. The resulting solution of our lignin product can then be used as desired for any suitable purpose.

The product produced by the above described process is soluble in water at a pH not less than 10.5 to the extent of at least 95% by weight. It strongly absorbs oxygen. In aqueous alkaline solution it is an effective dispersing agent i. e. for clay and other inorganic suspensions. The product has valuable properties as component in boiler water treatment, particularly for high pressure boilers, and it presents a useful starting material for preparation of pure organic degradation products from lignosulfonates.

Having fully disclosed the essential and novel features of our invention, it is to be understood that any modifications and variables utilizing the significant aspects of our invention are intended to be included within the scope of the appended claims.

We claim:

1. The process of producing a de-methylated lignin compound by controlled alkaline hydrolysis comprising the steps of preparing an aqueous mixture containing by weight 250 to 350 grams per liter of sodium lignosulfonate substantially free from calcium and magnesium ions, and 50 to 100 grams per liter of caustic soda, heating said mixture under pressure and at a temperature from 265 to 325° C. for a period of 30 to 120 minutes, and neutralizing the free excess caustic soda present in the resulting solution to a pH of about 10.5.

2. The process of producing a de-methylated lignin compound by controlled alkaline hydrolysis comprising the steps of preparing an aqueous mixture containing by weight 250 to 350 grams per liter of sodium lignosulfonate substantially free from calcium and magnesium ions, and 50 to 100 grams per liter of caustic soda, heating said mixture under pressure and at a temperature from 265 to 325° C. for a period of 30 to 120 minutes, acidifying the resulting solution to a pH of about 9 and drying the resulting mixture.

3. A de-methylated lignin compound soluble in water at a pH not less than 10.5 produced through controlled alkaline hydrolysis by the method of claim 1.

4. A de-methylated lignin compound soluble in water at a pH not less than 10.5 produced through controlled alkaline hydrolysis by the method of claim 2.

J. RICHTER SALVESEN.
CARLYLE HARMON.

REFERENCES CITED

The following references are of record in the file of this patent:

UNITED STATES PATENTS

| Number | Name | Date |
|---|---|---|
| 1,298,477 | Drewson | Mar. 25, 1919 |
| 2,405,450 | Salvesen et al. | Aug. 6, 1946 |

OTHER REFERENCES

Pepper: Pulp and Paper Magazine of Canada, Feb. 1945, pages 83–91.